(12) United States Patent
Dmitriev et al.

(10) Patent No.: US 9,778,496 B2
(45) Date of Patent: Oct. 3, 2017

(54) NONRECIPROCAL THREE-WAY DIVIDER BASED ON A MAGNETO-OPTICAL RESONATOR

(71) Applicant: UNIVERSIDADE FEDERAL DO PARA—UFPA, Belem (BR)

(72) Inventors: Victor Dmitriev, Belem (BR); Gianni Masaki Tanaka Portela, Belem (BR)

(73) Assignee: UNIVERSIDADE FEDERAL DO PARA—UFPA (BR)

( * ) Notice: Subject to any disclaimer, the term of this patent is extended or adjusted under 35 U.S.C. 154(b) by 0 days.

(21) Appl. No.: 14/900,797

(22) PCT Filed: Jun. 26, 2014

(86) PCT No.: PCT/BR2014/000210
§ 371 (c)(1),
(2) Date: Dec. 22, 2015

(87) PCT Pub. No.: WO2014/205535
PCT Pub. Date: Dec. 31, 2014

(65) Prior Publication Data
US 2016/0139437 A1    May 19, 2016

(30) Foreign Application Priority Data
Jun. 25, 2013 (BR) .......................... 102013018869 7

(51) Int. Cl.
*G02B 6/42* (2006.01)
*G02F 1/095* (2006.01)
(Continued)

(52) U.S. Cl.
CPC .......... *G02F 1/095* (2013.01); *G02B 6/1225* (2013.01); *G02B 6/4208* (2013.01); *G02F 1/093* (2013.01);
(Continued)

(58) Field of Classification Search
USPC ......................................... 385/39
See application file for complete search history.

(56) References Cited

U.S. PATENT DOCUMENTS

| | | | |
|---|---|---|---|
| 6,597,721 B1 * | 7/2003 | Hutchinson ............ | B82Y 20/00 372/102 |
| 7,689,068 B1 | 3/2010 | Wang et al. ..................... | 385/6 |

(Continued)

FOREIGN PATENT DOCUMENTS

| | | | | |
|---|---|---|---|---|
| CN | 101561531 | 10/2009 | ............. | G02B 6/122 |
| CN | 102323641 | 1/2012 | ............. | G02B 6/122 |
| WO | WO2012062005 | 5/2012 | ............. | G02F 1/095 |

OTHER PUBLICATIONS

Dmitriev, "A new optical component: nonreciprocal three-way divider based on magneto-optical resonator", Aug. 2013, IEEE.*

(Continued)

*Primary Examiner* — Eric Wong
(74) *Attorney, Agent, or Firm* — Hayes Soloway P.C.

(57) ABSTRACT

The present invention is based on a two-dimensional photonic crystal in which defects are inserted in a controlled manner, has the main function of division of the power of an input signal, excited in one of its six waveguides, among other three waveguides (output ones), while keeping isolation of the input port by means of two other waveguides. The operating principle of the device is based on the alignment of a dipole mode excited in the resonant cavity, in such a way that the nodes of this mode are oriented in the direction of two waveguides, so that these waveguides are not excited. Due to this alignment, each of the three output waveguides receive about one third of the power of input signal. The orientation of dipole mode is controlled by the applied DC magnetic field and the physical and geometrical parameters of the resonator.

7 Claims, 3 Drawing Sheets

(51) Int. Cl.
  *G02B 6/122* (2006.01)
  *G02F 1/09* (2006.01)
  *G02F 1/313* (2006.01)
  *G02B 6/12* (2006.01)

(52) U.S. Cl.
  CPC .......... *G02F 1/0955* (2013.01); *G02F 1/313* (2013.01); *G02B 2006/12154* (2013.01); *G02B 2006/12157* (2013.01); *G02F 2202/32* (2013.01); *G02F 2203/15* (2013.01)

(56) References Cited

U.S. PATENT DOCUMENTS

| | | | |
|---|---|---|---|
| 8,731,360 B2 | 5/2014 | Ouyang et al. | .......... G02B 6/10 |
| 2004/0008945 A1 | 1/2004 | Sigalas | .................... 385/45 |
| 2004/0080805 A1 | 4/2004 | Levy | ..................... 359/280 |
| 2006/0140539 A1 | 6/2006 | Lee et al. | .................... 385/43 |
| 2012/0243844 A1 | 9/2012 | Ouyang et al. | ............... 385/130 |

OTHER PUBLICATIONS

Dmitriev et al., "Nonreciprocal optical divider based on two-dimensional photonic crystal and magneto-optical cavity," Applied Optics, vol. 51, No. 24, Aug. 2012, pp. 5917-5920 (abstract only, 2 pgs).

Esmaieli et al., "Magneto-optical photonic crystal 1×3 switchable power divider," Photonics and Nanostructures—Fundamentals and Applications, vol. 10, No. 1, Jan. 2012, pp. 131-139 (abstract only, 2 pgs).

International Preliminary Report on Patentability issued in application No. PCT/BR2014/000210, dated Dec. 29, 2015 (6 pgs).

International Search Report and Written Opinion issued in application No. PCT/BR2014/000210, dated Oct. 21, 2014 (12 pgs).

Zhang et al., "Design of nonreciprocal waveguide devices based on two-dimensional magneto-optical photonic crystals," Optics & Laser Technology, vol. 50, Sep. 2013, pp. 195-201 (abstract only, 2 pgs).

\* cited by examiner

NONRECIPROCAL THREE-WAY DIVIDER BASED ON A MAGNETO-OPTICAL RESONATOR

CROSS-REFERENCE TO RELATED APPLICATION

This application is the 35 U.S.C. §371 national stage application of PCT Application No. PCT/BR2014/000210, filed Jun. 26, 2014, which claims priority to and the benefit of, Brazilian Patent Application No. 1020130188697, filed Jun. 25, 2013, which are both hereby incorporated by reference in their entireties.

The present invention relates to a nonreciprocal three-way divider based on a magneto-optical resonator capable of splitting a signal, present in an input channel, between three output channels. It also features the isolation function between the input port and the output ones.

The industrial sector, in particular the optical sector industry, demands both reciprocal devices, among which are the power dividers, and nonreciprocal devices, among which are the isolators.

The function of a power divider is splitting of the power of an input signal between two or more output channels. An isolator is used to allow the propagation of a signal only in a given direction, in order to avoid, mainly, problems in signal sources related to interference.

These two devices, widely used in microwave technology, can also be developed on the basis of structures with forbidden frequency band, for use in optical circuits and chips. Electromagnetic waves with frequency located in this band, also known as photonic band gap, cannot propagate inside the crystal lattice.

These structures, also known as "photonic crystals", allow the molding of the flow of light by the periodic modulation of the electric permittivity or the magnetic permeability of the constituent materials. They are subject of several ongoing studies. The creation of controlled defects inside the crystal lattice is related to the operating principle of most of the optical devices based on photonic crystals.

Several patents related to photonic crystals based devices for use in optical industry have been filed.

For example, the patent US2004008945 refers to a power divider based on a two-dimensional photonic crystal with hexagonal lattice, where three waveguides are inserted on the periodic structure by creating noncircular holes. The waveguides are connected to a resonator cavity located in the center of the device. The rectilinear waveguides are separated by the angle 120°, resembling the form of letter Y, and a signal applied to one of the waveguides (input) is equally divided between the remaining two waveguides (outputs).

On the other hand, the patent CN101561531 refers to a power divider based on a two-dimensional photonic crystal with square lattice. Analogously to the previous divider, this one has three ports and a resonator cavity located in its center. The final array, which resembles the format of letter T, has one input waveguide and two output waveguides, but, in this case, the positions of waveguides cannot be changed (input by output or vice versa) due to the reduced symmetry of this device.

Also noteworthy is the invention described by the patent CN102323641, which refers to a power divider with four output channels and one input channel. It is based on a two-dimensional photonic crystal with hexagonal lattice and it features two stages of division. Each divider stages resemble the divider related to the patent US2004008945, i.e., the signal that excites a input waveguide is divided between two intermediate waveguides (which are separated by an angle of 120°, resembling the format of the letter Y), and each intermediate waveguide is connected to two output waveguides, which also form between them angles of 120°. Therefore, each output waveguide conducts a signal with power approximately equal to 25% of the signal power in the input waveguide.

Moreover, the patent US2006140539 refers to an optical isolator based on a photonic crystal with hexagonal lattice. Defects are inserted in the crystal structure such that signal propagation occurs only in a given direction. In the opposite direction, the isolator does not allow the propagation of the signal. Isolators are mainly used to protect signal sources from unwanted interference caused by reflections along the propagation path.

Other devices, like the one described in patent US2004080805, enable unidirectional propagation of signals by controlling the Faraday rotation effect in a photonic crystal constructed with magnetic materials.

The aforementioned devices fulfill only one of the following functions: power division or isolation. A power divider for use in optical industry splits the power of an input signal between two or more outputs, whereas an isolator does not allow the propagation of the signal in a given direction.

There exists an increasing demand for communication networks with high integration density. It requires the miniaturization of components at the levels of optical chips, and this has motivated a series of research works.

The present invention has as the main advantage the integration of the functions of a reciprocal power divider and a nonreciprocal isolator in a single device. The present device has reduced dimensions, when compared to the use of two distinct devices to perform the same functions, which favors higher integration density in optical circuits.

The device in question works with uniform magnetization, which facilitates the construction of the magnetizing circuit structure. Moreover, it has good bandwidth and high isolation between the input port and the output ports.

Generally speaking, the structure consists of a photonic crystal with hexagonal lattice, where six waveguides are inserted by removing some holes of the crystal. The waveguides are connected to the center of the structure through a resonant cavity, built by change of the radius and position of the holes located in the central part of the structure. A signal applied to one of the waveguides has its power divided between three other waveguides. The two remaining waveguides are isolated from input one and serve for absorbing the reflected waves, in order to reduce the impact on the signal source caused by reflections from unmatched circuit elements.

In a specific way, the device has the following features:
the photonic crystal in which the device is based comprises a triangular lattice of air holes etched in a magnetic semiconductor;
the radius of the air holes is 0.3a is the crystal lattice constant);
six waveguides are inserted into the photonic crystal by removing air holes in a straight line. The waveguides are symmetrically connected to the magneto-optical resonator and separated from each other by 60° angle;
one uniformly magnetized magneto-optical resonator is produced in the two-dimensional photonic crystal by varying the radius and the position of some air holes located in the center part of the device;

a dipole mode is excited in the resonant cavity and its nodes are aligned with two waveguides with matched loads that function for absorbing the signal;

the magneto-optical material in which air holes are inserted is anisotropic and described by the following expressions for the electric permittivity and magnetic permeability:

$$[\varepsilon] = \varepsilon_0 \begin{pmatrix} 6.25 & -i0.3 & 0 \\ i0.3 & 6.25 & 0 \\ 0 & 0 & 6.25 \end{pmatrix}; \mu = \mu_0$$

where $\varepsilon$ is the electric permittivity of the material (in Farads per meter);

$\varepsilon_0$ is the electric permittivity of the free space (in Farads per meter); —$\mu$ is the magnetic permeability of the material (in Henrys per meter); —$\mu_0$ is the magnetic permeability of the free space (in Henrys per meter);

Below the invention is described in detail as well as the figures are shown, in order to illustrate its operation. It is expected, therefore, that the operation of the device as well as its potential applications can be well understood.

FIG. 1 schematically shows the configuration with six ports and dipole mode in the resonator. Item (a) schematically shows the proposed divider and an operation of rotation by 60° (which is among the elements of the symmetry group that characterizes the device). Item (b) shows the dipole mode without the application of magnetization. Item (c) shows the dipole mode rotated by the angle 30° clockwise, due to application of an external DC magnetic field. $H_0$. Item (d) shows the dipole mode rotated by the angle 30° in a counterclockwise direction, due to application of the external DC magnetic field $-H_0$.

Figure 5:
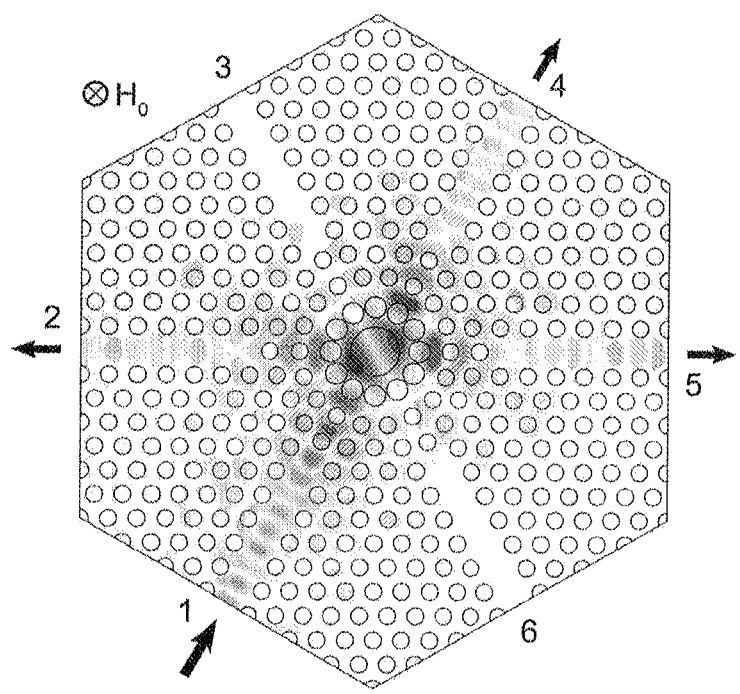

FIG. 5 is the top view of the device that shows the periodic structure of the photonic crystal, the six straight waveguides, the resonant cavity and the $H_z$ component of the electromagnetic field inside the divider, for excitation at port (1), at the central normalized frequency $\omega a/2\pi c=0.3035$, where $\omega$ is the angular frequency (in radians per second); a is the lattice constant of the photonic crystal (in meters); c is the speed of light in free space (about 300,000,000 meters per second).

Figure 1:
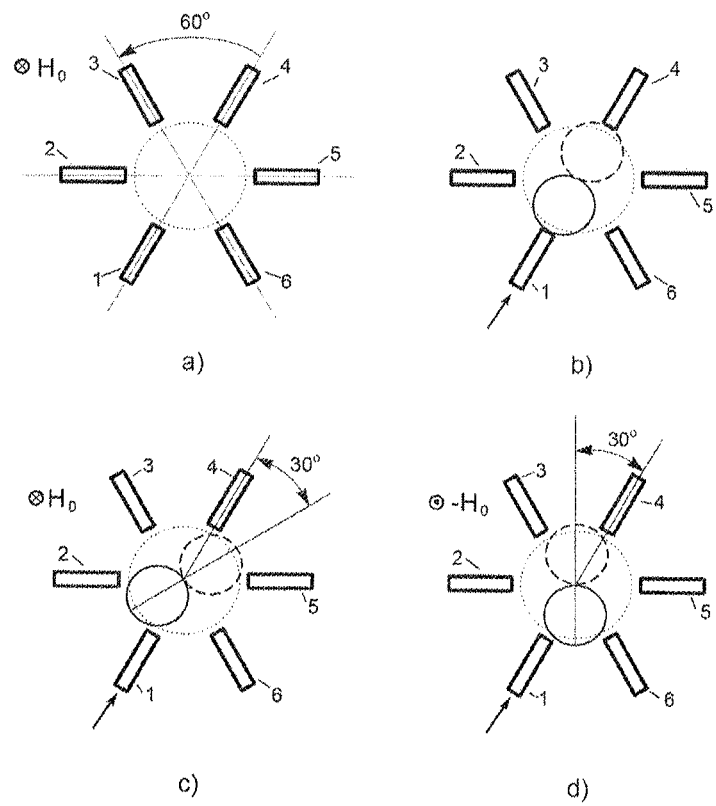

Considering the case in which a DC magnetic field $H_0$ is not applied and the excitation is in one of the six waveguides (1), the resonator of the divider supports two degenerate modes, which rotate in opposite directions. By the superposition of these two degenerate modes, a stationary dipole mode is created, as shown in FIG. 1(b). The electromagnetic field of this mode excites electromagnetic waves in all the remaining waveguides (2), (3), (4), (5) and (6). In this case, the division is not equal and the divider is reciprocal.

By applying a DC magnetic field $H_0$, the stationary dipole mode is rotated by the angle 30° around the z axis, in a clockwise way. In this case, the off-diagonal parameter of the electric permittivity tensor related to the magneto-optical material is equal to 0.3. As can be seen in FIG. 1(c), the nodes of the dipole are aligned with waveguides (3) and (6).

Therefore, these two waveguides are not excited. From FIG. 2 it can be seen that in waveguides (2), (4) and (5) the field intensity is equal, in the proportion ⅓:⅓:⅓. The rotation of the dipole mode occurs due to magneto-optical properties of the resonator and it can be adjusted by modifying the geometric parameters of the resonator and the magnetic field DC $H_0$.

In the case where the DC magnetic field is applied in the opposite direction, i.e., $-H_0$, as shown in FIG. 1(d), the field pattern is also rotated by the angle 30°, but in the opposite direction (counter-clockwise). Thus, waveguides (2) and (5) are isolated and the power division of the electromagnetic wave occurs between waveguides (3), (4) and (6).

Figure 2:
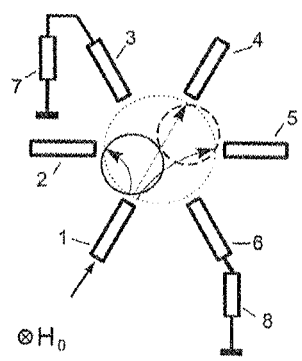
FIG. 2 shows details of the divider of FIG. 1(c) with two matched loads (7) and (8). The arrows inside the resonator show the division of the incident wave.

The isolation properties of the structure can be observed by exciting output ports (ports (2), (4) and (5) in FIG. 2). The excitation of these ports is related to signal reflection caused by unmatched elements connected to these ports. Due to the symmetry of rotation by 60° of this structure, applying excitation in only one of the six ports, e.g., port (1), is sufficient, in order to obtain the characteristics of the divider. For the other ports, the characteristics in question can be obtained by cyclic permutation of the ports (ports renumbering). These three cases are shown in FIGS. 3(a), 3(b) and 3(c), which are obtained by a simple rotation of the dipole mode of FIG. 2 by 30°, 180° and 210°, respectively.

Figure 3:
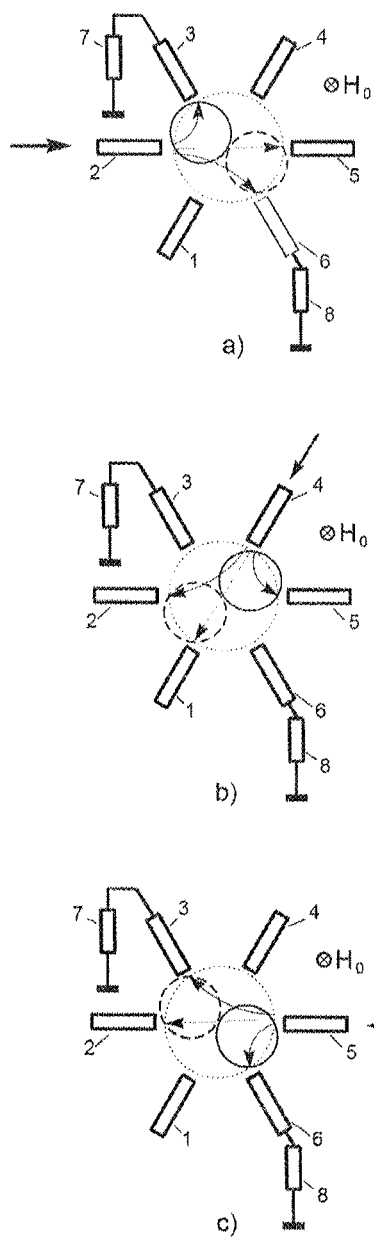
FIG. 3 shows the divider of FIG. 2 being excited through ports (2), (4) and (5)—items (a), (b) and (c), respectively.

In all cases of FIG. 3, two ports, where the nodes of the stationary wave are located, are decoupled in relation to the excitation port. The reflected power to port (1), originated from ports (2), (4) and (5), is very small (only one third of the reflected power at port (4)), i.e., most of the reflected power originated at output ports is absorbed by ideally matched loads (7) and (8) connected in ports (3) and (6). Therefore, there is a significant reduction of the influence of parasite reflections originated from unmatched loads, which corresponds to the main idea of the invention in question.

The application of a DC magnetic field $H_0$ promotes the separation of frequencies $\omega^+ e\ \omega^-$ of the two degenerated modes that rotate in opposite directions. These two modes comprise the dipole mode of the resonator. The intensity of this separation depends on parameter g (off-diagonal term of the electric permittivity tensor of the magneto-optical material). The present invention is designed to operate with g=0.3.

The operational frequency band of the divider is proportional to the separation of frequencies $\omega^+$ and $\omega^-$, associated with the two dipole modes which rotate in opposite directions. The higher the g value, the wider the operational frequency band of the divider. The parameter g is proportional to magnetization M of the magnetic material.

The waveguide losses are discounted from the transmission coefficients between the ports of the device. These losses, on the order of −2 dB, are discounted in order to make evident only the losses related to the divider itself.

Figure 4:
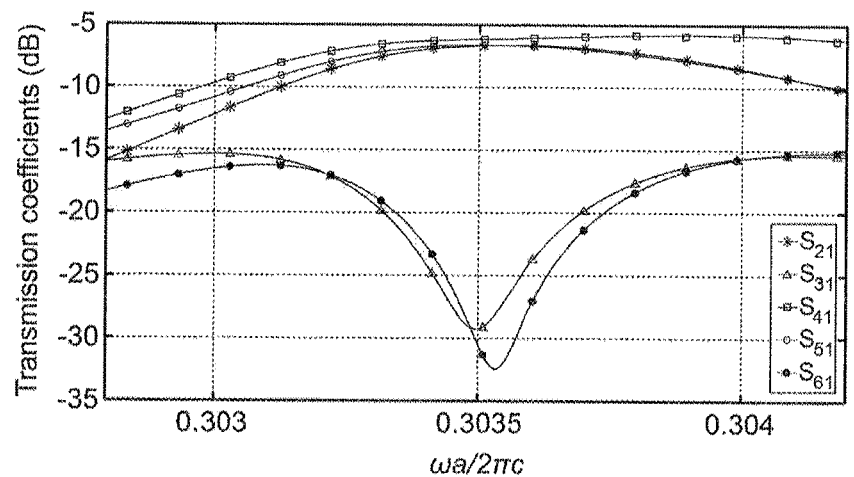
FIG. 4 shows the frequency response of the divider considering the application of excitation on port (1).

The frequency response of the divider, considering port (1) as input and ports (2) to (6) as output ones, is shown in FIG. 4. At the normalized central frequency $\omega a/2\pi c=0.3035$, the power division between output ports (2), (4) and (5) is about −6.4 dB. Ports (3) and (6), where ideally matched loads (7) and (8) are connected, are isolated from the input port for approximately −29 dB, i.e., there are minimal power losses in these ports.

The divider bandwidth, at the isolation level −20 dB, is equal to 219 GHz and, in this band, the variation of division levels is equal to (−6.4±0.4) dB. FIG. 5 shows the distribution of $H_z$ field component, at the central frequency. The nodes of the dipole mode are oriented in the directions of ports (3) and (6).

The invention claimed is:

1. A nonreciprocal three-way divider based on a magneto-optical resonator, comprising a two-dimensional photonic crystal in which six waveguides and a resonant cavity are inserted, wherein dividing a signal present in an input port between three output ports, with high isolation of the former in relation to the latter, wherein the transmission level for the isolated ports is about −29 dB, the transmission level for the output ports is in the range (−6.4±0.4) dB and the bandwidth, for the isolation level −20 dB, is 219 GHz.

2. The nonreciprocal three-way divider based on a magneto-optical resonator in accordance with claim 1, wherein a dipole mode excited in the resonator cavity has its nodes aligned with two waveguides where matched loads are situated.

3. The nonreciprocal three-way divider based on a magneto-optical resonator in accordance with claim 1, wherein two waveguides, whose orientations are aligned with the nodes of the dipole mode, receive the most part of the parasite reflections originated due to unmatched elements in the output ports of the device.

4. The nonreciprocal three-way divider based on a magneto-optical resonator in accordance with claim 1, wherein due to the alignment of nodes of dipole mode with two waveguides, the three remaining waveguides (output ones) receive approximately one third of the power of input signal.

5. The nonreciprocal three-way divider based on a magneto-optical resonator in accordance with claim 2, wherein two waveguides, whose orientations are aligned with the nodes of the dipole mode, receive the most part of the parasite reflections originated due to unmatched elements in the output ports of the device.

6. The nonreciprocal three-way divider based on a magneto-optical resonator in accordance with claim 3, wherein due to the alignment of nodes of dipole mode with two waveguides, the three remaining waveguides (output ones) receive approximately one third of the power of input signal.

7. The nonreciprocal three-way divider based on a magneto-optical resonator in accordance with claim 6, wherein due to the alignment of nodes of dipole mode with two waveguides, the three remaining waveguides (output ones) receive approximately one third of the power of input signal.

* * * * *